United States Patent
Fjelde

(10) Patent No.: US 10,781,600 B2
(45) Date of Patent: Sep. 22, 2020

(54) OVERLYING CROSS BAR FASTENER

(71) Applicant: Comrod AS, Tau (NO)

(72) Inventor: Ole Gunnar Fjelde, Tau (NO)

(73) Assignee: Comrod AS, Tau (NO)

( * ) Notice: Subject to any disclaimer, the term of this patent is extended or adjusted under 35 U.S.C. 154(b) by 0 days.

(21) Appl. No.: 16/308,605

(22) PCT Filed: Jul. 4, 2017

(86) PCT No.: PCT/NO2017/050177
§ 371 (c)(1),
(2) Date: Dec. 10, 2018

(87) PCT Pub. No.: WO2018/009074
PCT Pub. Date: Jan. 11, 2018

(65) Prior Publication Data
US 2019/0153742 A1    May 23, 2019

(30) Foreign Application Priority Data

Jul. 7, 2016  (NO) .................................. 20161131

(51) Int. Cl.
*E04H 12/02* (2006.01)
*E04H 12/24* (2006.01)
(Continued)

(52) U.S. Cl.
CPC ............. *E04H 12/02* (2013.01); *E04H 12/24* (2013.01); *F16M 13/02* (2013.01); *H02G 7/20* (2013.01)

(58) Field of Classification Search
CPC ............ E04H 12/02; E04H 12/24; H02G 7/20
See application file for complete search history.

(56) References Cited

U.S. PATENT DOCUMENTS 689,387 A * 12/1901 Crossland ............... E04H 12/00
52/848
2,075,700 A * 3/1937 Burke .................... E04H 12/24
174/179
(Continued)

FOREIGN PATENT DOCUMENTS

CN    102296866    12/2011
CN    104453332     3/2015
(Continued)

OTHER PUBLICATIONS

Norwegian Search Report, Norwegian Patent Application No. 20161131, dated Jan. 27, 2017.
(Continued)

*Primary Examiner* — Rodney Mintz
(74) *Attorney, Agent, or Firm* — Andrus Intellectual Property Law, LLP

(57) ABSTRACT

A device, a system and a method are for attaching a crossbar to a hollow composite pylon where the crossbar is arranged to carry at least one conductor. The hollow composite pylon, the crossbar and the conductor form components of a pylon structure for the transmission or distribution of power. The device has an adapter, which, in the position of application, is pivotably attached to the crossbar, is slideable at least into or over the, in the position of application, upper end portion of the hollow composite pylon and mainly along the longitudinal axis of the hollow composite pylon during part of the installation phase.

2 Claims, 5 Drawing Sheets

(51) Int. Cl.
*H02G 7/20* (2006.01)
*F16M 13/02* (2006.01)

(56) References Cited

U.S. PATENT DOCUMENTS

| | | | | |
|---|---|---|---|---|
| 2,610,818 | A * | 9/1952 | Ridgers | H01B 17/24 |
| | | | | 248/226.12 |
| 3,013,584 | A | 12/1961 | Reed et al. | |
| 4,615,154 | A | 10/1986 | Troutner | |
| 4,932,623 | A * | 6/1990 | Reisdorff | E04H 12/24 |
| | | | | 248/219.3 |
| 5,605,017 | A * | 2/1997 | Fingerson | E04C 3/28 |
| | | | | 174/153 R |
| 6,116,556 | A | 9/2000 | Roth | |
| 6,202,964 | B1 * | 3/2001 | Thornhill | A01M 31/02 |
| | | | | 248/219.4 |
| 6,250,596 | B1 * | 6/2001 | Gordin | E04H 12/24 |
| | | | | 248/218.4 |
| 6,520,462 | B2 * | 2/2003 | Herron | E04H 12/24 |
| | | | | 248/188.2 |
| 6,626,406 | B1 * | 9/2003 | Olson, Jr. | H02G 7/20 |
| | | | | 248/219.2 |
| 8,181,422 | B2 * | 5/2012 | Barland | B64C 1/062 |
| | | | | 244/129.1 |
| 8,397,350 | B2 * | 3/2013 | Yeames | B63B 21/04 |
| | | | | 24/129 R |
| 8,652,629 | B2 | 2/2014 | Lockhart et al. | |
| 9,016,022 | B2 | 4/2015 | Oliphant | |
| 9,912,135 | B2 * | 3/2018 | Rodriguez | H02G 7/00 |
| 2005/0133244 | A1 * | 6/2005 | Devine | H02G 1/04 |
| | | | | 174/68.2 |
| 2010/0155537 | A1 * | 6/2010 | Barland | B64C 1/062 |
| | | | | 244/133 |
| 2011/0083394 | A1 | 4/2011 | Gratzer | |
| 2012/0048613 | A1 | 3/2012 | Lockhart et al. | |
| 2015/0075859 | A1 * | 3/2015 | Rodriguez | H02G 7/00 |
| | | | | 174/5 R |
| 2015/0297921 | A1 * | 10/2015 | Putzer | E04G 3/00 |
| | | | | 29/428 |
| 2016/0233657 | A1 * | 8/2016 | Ceko | E04H 12/24 |
| 2018/0328070 | A1 * | 11/2018 | Arlund | E04H 12/24 |
| 2019/0161332 | A1 * | 5/2019 | Chaput | E04H 12/344 |

FOREIGN PATENT DOCUMENTS

| | | |
|---|---|---|
| NO | 337585 | 6/2015 |
| WO | 2012/025153 | 3/2012 |

OTHER PUBLICATIONS

International Search Report, PCT/NO2017/050177, dated Sep. 14, 2017.
Written Opinion and Reply, PCT/NO2017/050177, dated Sep. 14, 2017.
Written Opinion, PCT/NO2017/050177, dated Jul. 26, 2018.
International Preliminary Report on Patentability, dated Oct. 3, 2018.

* cited by examiner

US 10,781,600 B2

OVERLYING CROSS BAR FASTENER

CROSS-REFERENCE TO RELATED APPLICATIONS

This application is the U.S. national stage application of International Application PCT/NO2017/050177, filed Jul. 4, 2017, which international application was published on Jan. 11, 2018, as International Publication WO 2018/009074 in the English language. The International Application claims priority of Norwegian Patent Application No. 20161131, filed Jul. 7, 2016. The international application and Norwegian application are both incorporated herein by reference, in entirety.

FIELD

This invention relates to an overlying crossbar fastener. More particularly, it relates to a device for attaching a crossbar to a hollow composite pylon where the crossbar is arranged to carrying at least one live conductor, the hollow composite pylon, the crossbar and the conductor forming components of a pylon structure for the transmission or distribution of power. The invention also includes a system for attaching the crossbar fastener and a method for attaching the crossbar fastener to the hollow composite pylon.

BACKGROUND

The use of hollow composite pylons as the supporting element in transmission and distribution lines for power is known. When a crossbar is used for the suspension of conductors, the crossbar is attached to the composite pylon mainly in two different ways, both derived from attachment methods known from wooden pylons.

The crossbar may be clamped against the pylon, for example by means of a stirrup or it may be carried by a bracket, which is bolted to the composite pylon. Combinations of these are also known. Both methods exhibit at least unfortunate deformations or locally great strains on the composite pylon.

SUMMARY

The invention has for its object to remedy or to reduce at least one of the drawbacks of the prior art or at least provide a useful alternative to the prior art.

The object is achieved through the features that are specified in the description below and in the claims that follow.

The invention is defined by the independent claims. The dependent claims define advantageous embodiments of the invention.

In a first aspect, the invention relates more specifically to a device for attaching a crossbar to a hollow composite pylon where the crossbar is arranged to carry at least one conductor, the hollow composite pylon, the crossbar and the conductor forming components of a pylon structure for the transmission or distribution of power. The device is characterized in that it comprises an adapter, which, in the position of application, is pivotably attached to the crossbar, being slideable at least into or over the, in the position of application, upper end portion of the composite pylon and mainly along the longitudinal axis of the composite pylon during part of the installation phase.

According to the invention, a crossbar is placed over the hollow composite pylon. The crossbar may be attached to one or more hollow composite pylons. By connecting the crossbar to the hollow composite pylon or pylons by means of an adapter which is slideable into or over the upper portion of the hollow composite pylon, a favourable transmission and distribution of forces from the crossbar to the hollow composite pylon or pylons is achieved.

Axial forces from the crossbar acting in the axial direction of the composite pylon may thereby be distributed relatively evenly over the end portion of the composite pylon.

The crossbar is pivotably attached to the adapter. This is relevant when the crossbar is attached to two or more composite pylons. The occurrence of bending stresses around the pivot axis, for example by axial displacement of the crossbar is thereby avoided where the composite pylons are deflected under the influence of wind forces, for example.

The crossbar may be at a level of height above the composite pylon, which is advantageous both from a design point of view and a load-distribution point of view.

The crossbar may be pivotably attached to the adapter, the crossbar being pivotable around an axis in the horizontal plane.

In the position of application, the adapter may be at least partially rotatable around the longitudinal axis of the composite pylon. Thereby, the crossbar may be protected from forces arising from dissimilar loads on the conductors, for example. Such loads may otherwise result in considerable torsional forces being transmitted via the adapter.

The adapter may include an internal body fitting complementarily into the upper portion of the composite pylon or an external body fitting complementarily around the upper portion of the composite pylon. There may also be combinations.

The adapter may include a guide which is arranged to guide the adapter into the desired position relative to the composite pylon, for example during installation work with the aid of a helicopter.

At least the adapter or the composite pylon may include a divided slot extending along the circumference thereof. The slot is arranged to receive, for example, a bolt extending through the adapter and the composite pylon in a radial direction. The slot helps the adapter to be partially rotatable relative to the composite pylon while the adapter is held in a desired position relative to the composite pylon at the same time.

In a second aspect, the invention relates more specifically to a system.

The system may alternatively include a spreader, for example in the form of a tackle, which is attached between a second composite pylon and the crossbar after the crossbar has been attached to a first composite pylon.

The system overcomes, among other things, installation problems arising from inaccurate alignment of the composite pylons.

In a third aspect, the invention relates more specifically to a method for attaching a crossbar to a composite pylon where the crossbar is arranged to carry at least one conductor, the composite pylon, the crossbar and the conductor forming components in a pylon structure for the transmission or distribution of power. The method is characterized by an adapter, which, in the position of application, is attached to the crossbar, being slid at least into or over the, in the position of application, upper end portion of the composite pylon, mainly along the longitudinal axis of the composite pylon, during part of the installation phase.

The invention provides a simplified and favourable connection between the crossbar and the composite pylon or pylons. The connection has the effect of making forces in the pylon structure be reduced and distributed in a favourable way compared to that of known designs. The joint is assembling-friendly and requires relatively little equipment at the site of installation, which is of great value in often remote places.

In an embodiment of the method the crossbar is simultaneously connected to more than one hollow composite pylon, and comprising, before the step of sliding said adapters into or over the upper portion of the hollow composite pylons, a step of at least temporarily installing a spreader between the upper portions of the hollow composite pylons.

BRIEF DESCRIPTION OF THE DRAWINGS

In what follows, examples of preferred embodiments, systems and methods are described, which are illustrated in the accompanying drawings, in which.

DETAILED DESCRIPTION OF THE DRAWINGS

Figure 1:
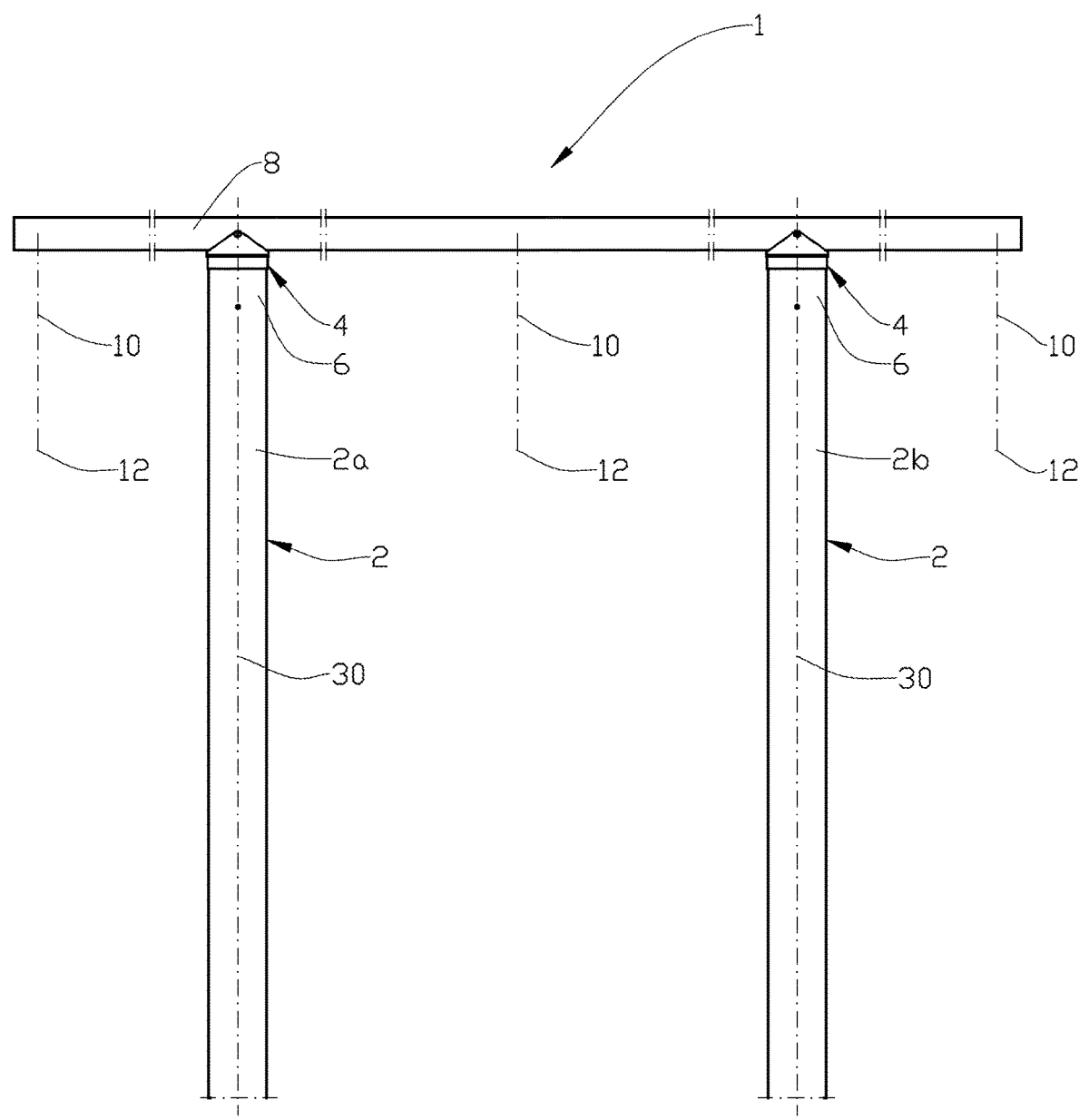
FIG. 1 shows, in a side view, a so-called portal pylon (H-shaped pylon) in which a crossbar is attached to composite pylons by means of adapters according to the invention.

In the drawings, the reference numeral 1 indicates a pylon structure comprising two hollow composite pylons 2 in the form of a first composite pylon 2a and a second composite pylon 2b, adapters 4, which are arranged at the respective upper portions 6 of the composite pylons 2, and a crossbar 8 extending between and being connected to the adapters 4. The composite pylons are generally indicated by the reference numeral 2, but in cases in which it is necessary to distinguish between them, the reference numerals 2a, 2b are used.

In this exemplary embodiment, the crossbar 8 carries three insulators 10 with respective conductors 12.

Figure 2:
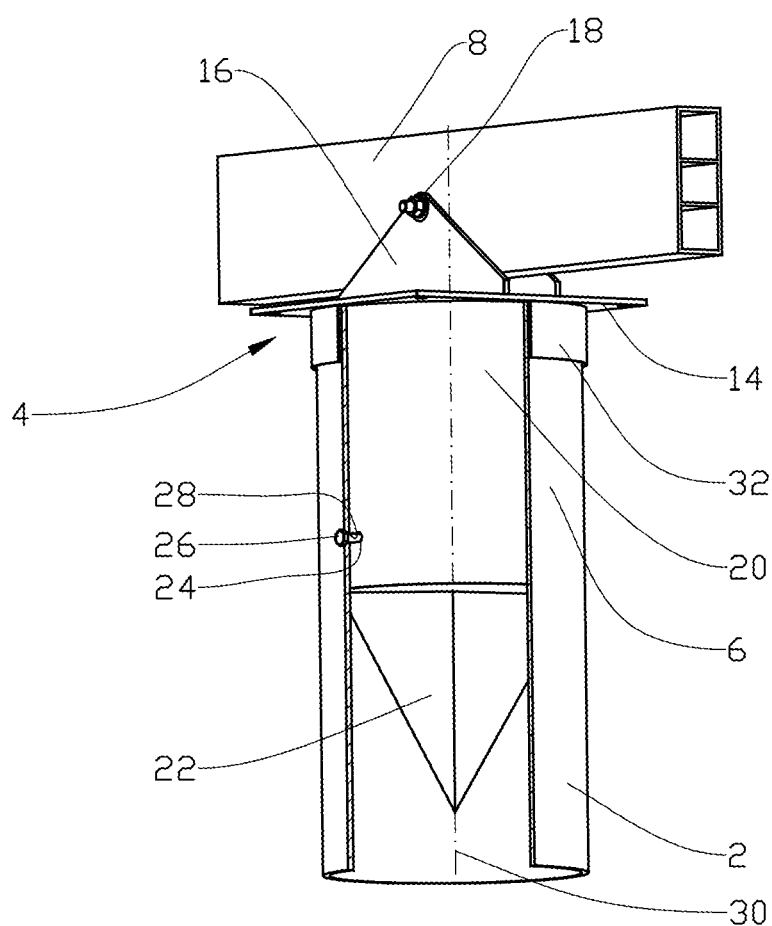
FIG. 2 shows, in perspective, on a larger scale and partially in section, a section comprising the upper portion of the composite pylon, the adapter and the crossbar.

In FIG. 2, the connection between the crossbar 8 and the hollow composite pylon 2 is shown on a larger scale. In this exemplary embodiment, the adapter 4, which is shown in a somewhat simplified form, includes an attachment 14 in the form of a plate resting against the upper portion 6. The attachment 14 is provided with a fork mount 16, which is pivotably connected to the crossbar 8 by means of a bolt 18. From the attachment 14 an internal body 20, here in the form of a pipe, projects into the upper portion 6 of the composite pylon 2. The internal body 20 is provided with a guide 22, which is arranged to facilitate the insertion of the adapter 4 into the upper portion 6.

The internal body 20 may be provided with a slot 24 elongated in the radial direction. The slot 24 is arranged to receive, for example, a bolt 26 extending through a bore 28 in the upper portion 6. The slot 24 helps to make the internal body 20 limitedly rotatable around the longitudinal axis 30 of the composite pylon 2. It is obvious that the slot 24 may equally well be in the upper portion 6 and the bore 28 in the internal body 20.

An external body 32, here in the form of a pipe, extends externally over the upper portion 6. In this embodiment, the main function of the external body 32 is to prevent water from penetrating into the composite pylon 2. In other embodiments, the external body 32 may equally well be carrying load.

Here, the adapter 4 thus comprises the attachment 14, the fork mount 16, the internal body 20 and the external body 32.

The attachment 14 may be formed with connections, not shown, for diagonal struts, for example.

The internal body 20 and the external body 32 are, in principle, freely rotatable against the upper portion 6 around the longitudinal axis 30 of the composite pylon 2.

Figure 3:
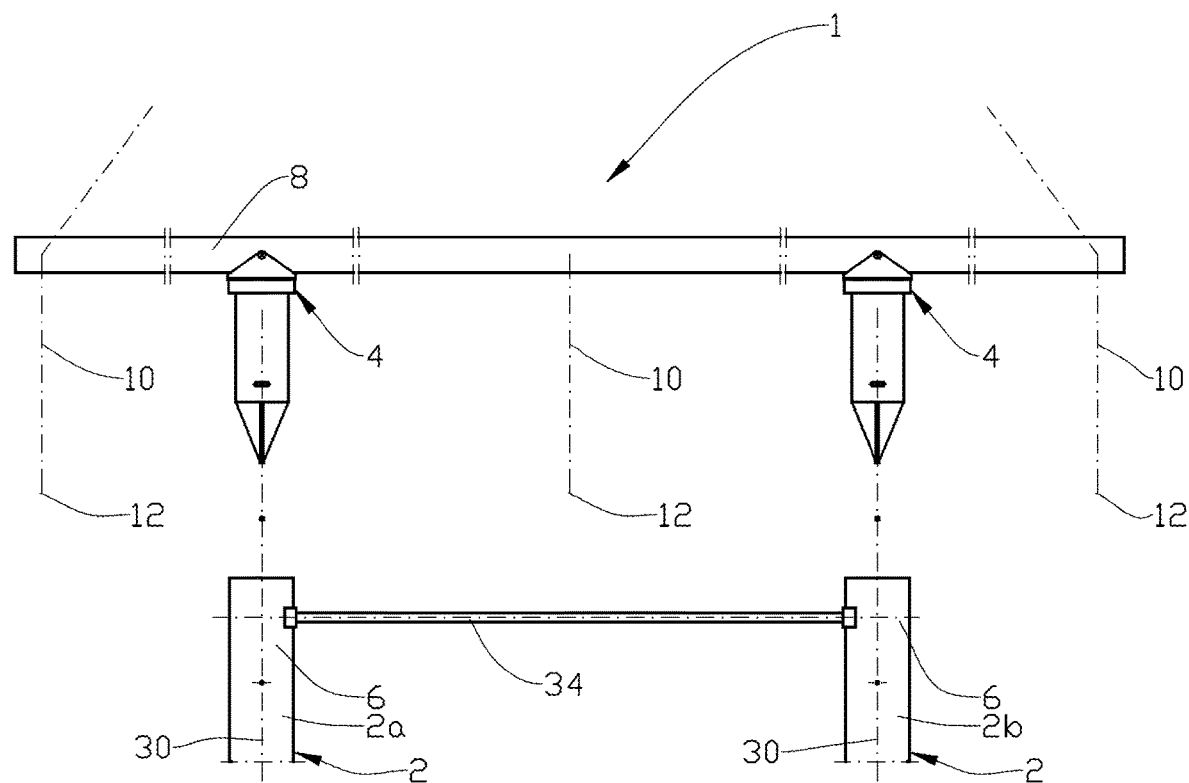
FIG. 3 shows the same as FIG. 1, but where the crossbar with adapters is ready to be fitted to the composite pylons.

In FIG. 3, the crossbar 8 is shown while hanging from a helicopter, not shown, and just before the adapters 4 are to be inserted into the upper portions 6 of the composite pylons 2a and 2b. A spreader 34 ensures that the upper portions 6 remain correctly spaced apart. The spreader 34, which is detachable may consist of a rod or a strap, for example, depending on whether the upper portions 6 must be moved away from each other or pulled together to take the correct distance.

The guides 22 makes it easier to enter the upper portions 6.

Figure 4:
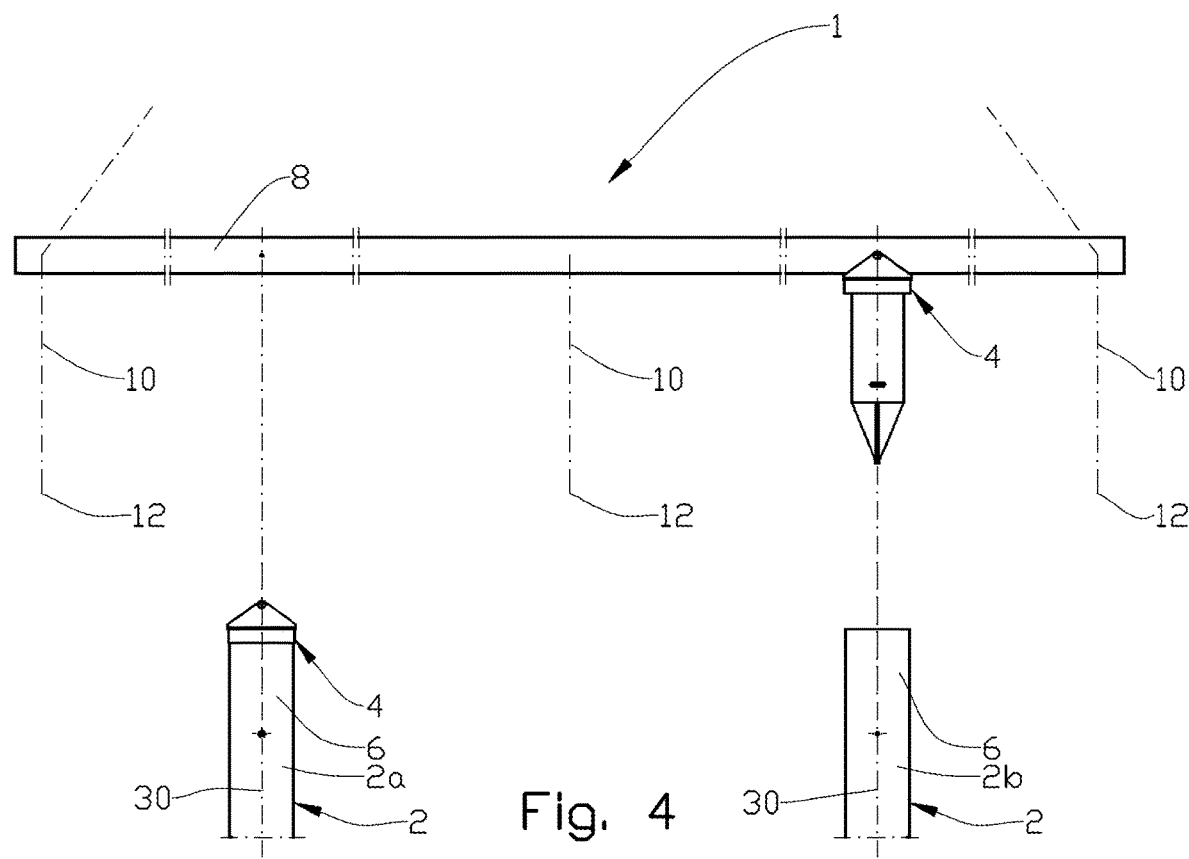
FIG. 4 shows the same as FIG. 3, but, here, one adapter has already been fitted to one of the composite pylons.

In FIG. 4, an alternative system for installing the crossbar 8 is shown. Here, one adapter 4 has already been placed in the upper end portion 6 of the first composite pylon 2a. The second adapter 4, which is to be placed in the upper end portion 6 of the second composite pylon 2b is attached to the crossbar 8.

Thereby the assembly of the crossbar 8 and adapter 4 has only to enter the upper portion 6 of the second composite pylon 2b and then be landed in the adapter 4, which is already in the upper end portion 6 of the first composite pylon 2a. After the helicopter, not shown, has been disconnected, the adapter 4 of the first composite pylon 2a may be brought into the correct position relative to the crossbar 8, for example by means of a tackle, not shown, which is connected between the adapter 4 and the crossbar 8.

Figure 5:
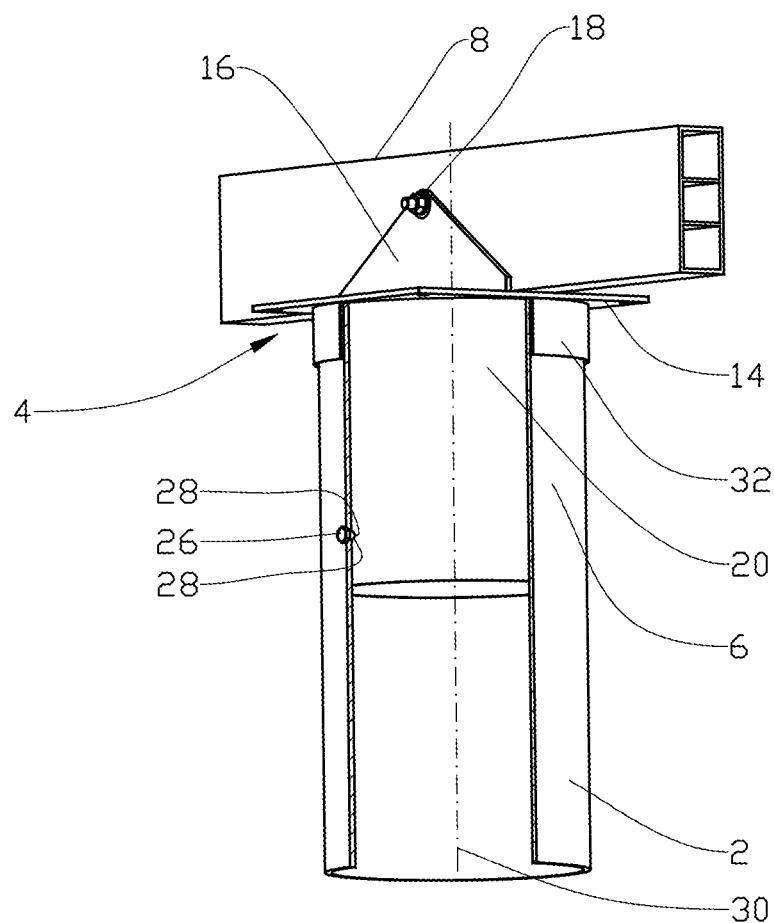
FIG. 5 shows a section corresponding to FIG. 2, but where the adapter has been adapted for a solution in which the crossbar is connected to a single composite pylon.

In an alternative embodiment, which is shown in FIG. 5, the crossbar 8 is locked in relation to rotation around the bolt 18 and around the longitudinal axis 30 of the composite pylon 2. This embodiment is especially intended for a pylon structure 1 in which only one composite pylon 2 is used.

Figure 6:
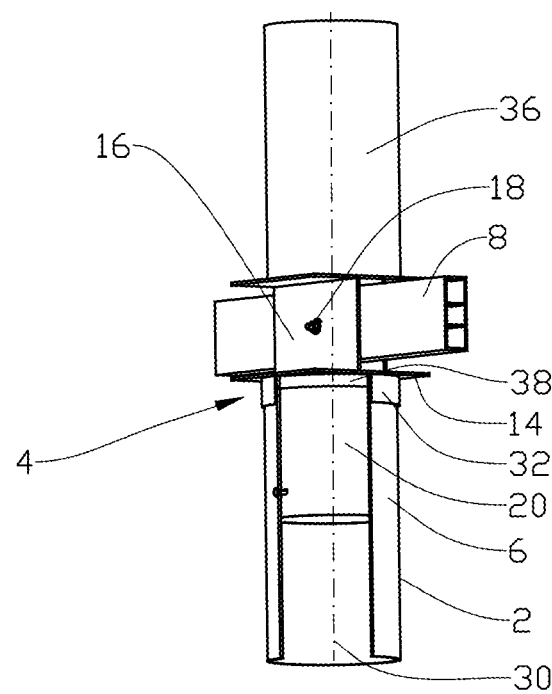
FIG. 6 shows, on a somewhat smaller scale, the same as FIG. 2, but where a body extends upwards from the adapter to support, for example, a possible overlying conductor.

In FIG. 6, an embodiment in which a body 36 projects up from the adapter 4 is shown. This embodiment is used, for example, to carry an overlying conductor, not shown.

There may be a need to adjust the height of a crossbar 8. This may be done, for example, by placing a spacer ring 38 between the attachment 14 and the upper portion 6, see FIG. 6.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A pylon structure for transmission or distribution of power, the pylon structure comprising:
   a crossbar configured to carry at least one live conductor;
   a first hollow composite pylon;
   a second hollow composite pylon;
   a first adapter slidably inserted at least into or over an upper portion of the first hollow composite pylon; and
   a second adapter slidably inserted at least into or over an upper portion of the second hollow composite pylon;
   wherein each of the first adapter and the second adapter is pivotably attached to the crossbar, and wherein the crossbar is configured to pivot about at least one axis in a horizontal plane to mitigate bending stress in the crossbar upon deflection of the first hollow composite pylon or the second hollow composite pylon.

2. A system comprising:
   a plurality of adapters;
   a plurality of hollow composite pylons; and
   a crossbar pivotably attached to the plurality of hollow composite pylons via the plurality of adapters, wherein the crossbar is configured to pivot about at least one first axis in a horizontal plane;
   wherein each of the plurality of adapters is configured to slide at least into or over an upper portion of each hollow composite pylon and along a second axis during part of an installation phase, the second axis being a longitudinal axis of the hollow composite pylon; and
   wherein the system further comprises a spreader positioned between the upper portions of the hollow composite pylons, the spreader configured to maintain a correct spacing between the upper portions.

* * * * *